Patented Dec. 12, 1950

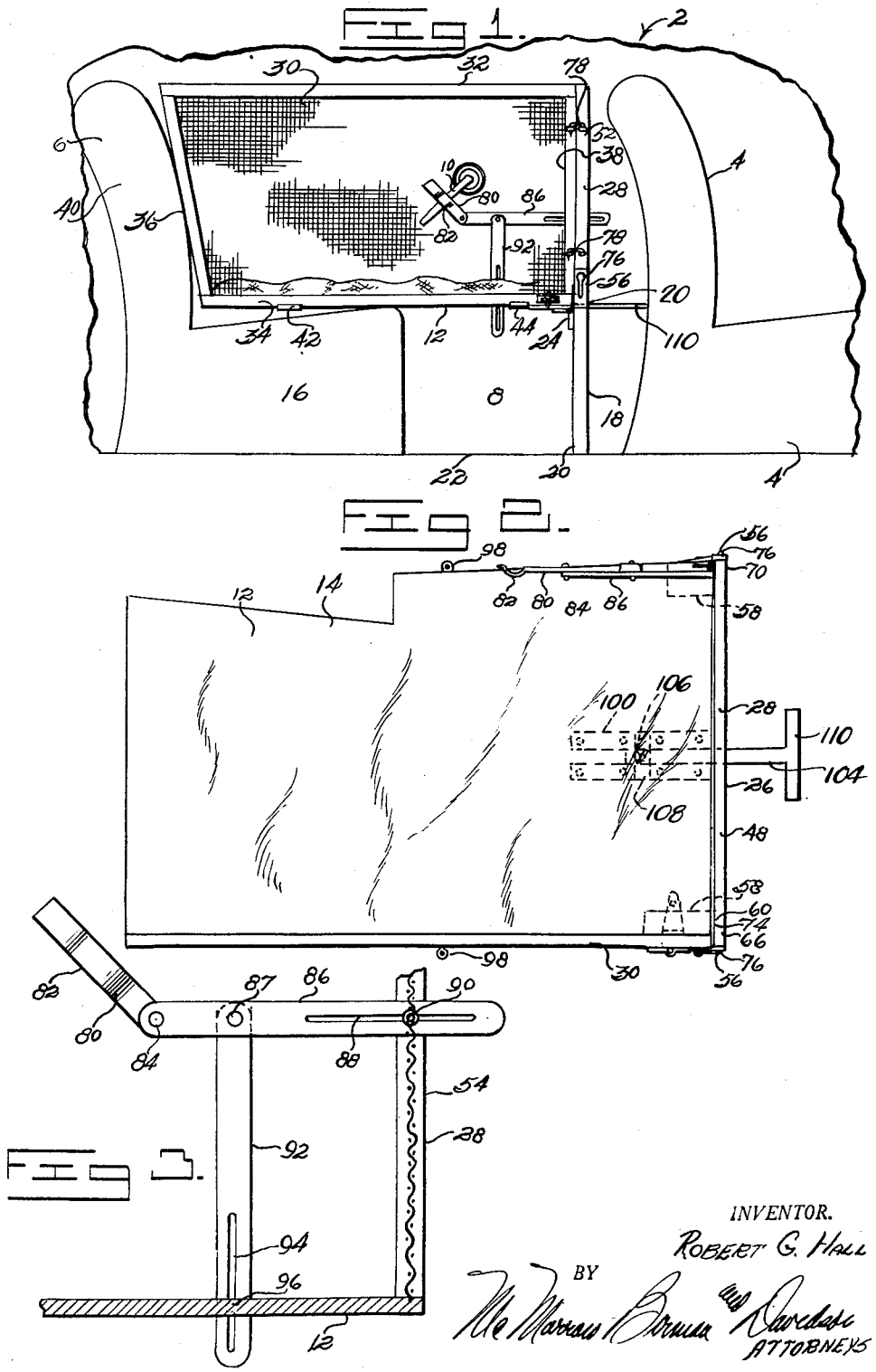

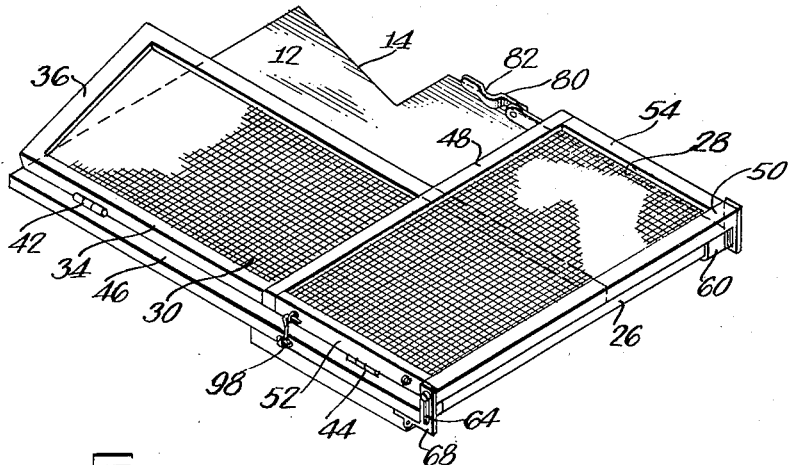
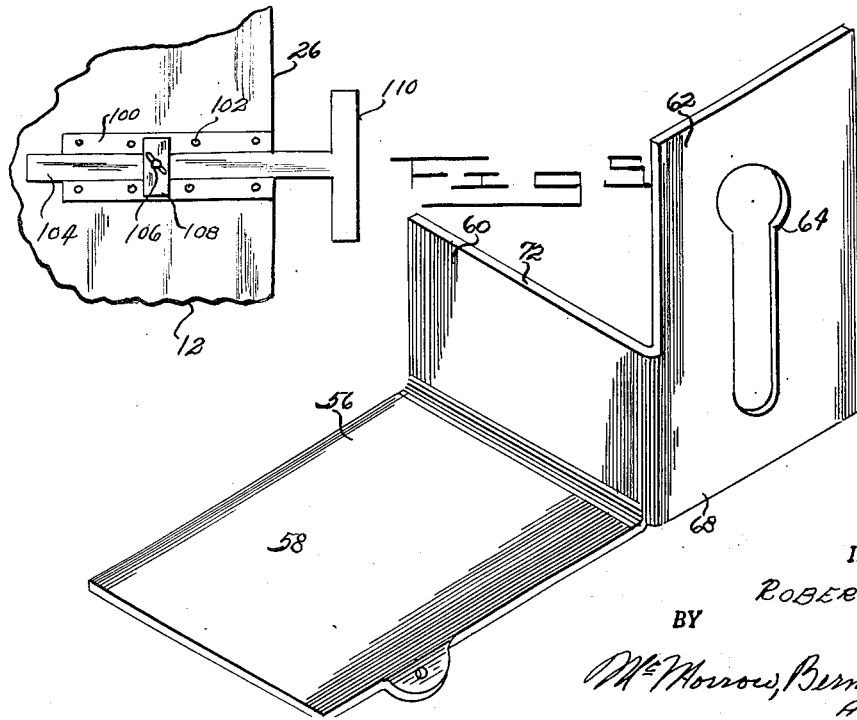

2,533,792

UNITED STATES PATENT OFFICE 2,533,792

BABY'S AUTOMOBILE TRAVELING PEN-BED

Robert G. Hall, Mancelona, Mich.

Application September 27, 1946, Serial No. 699,747

4 Claims. (Cl. 5—94)

This invention relates to baby cribs and play pens for use in vehicles.

An object of the invention is to provide a combination play pen and bed for children, which may be installed in a movable vehicle without any structural alterations of the vehicle itself.

Another object of the invention is to provide a traveling play pen and crib for use in a vehicle, and in which a child can stand, sit, crawl, lie down, or sleep, while traveling, with the relative comfort it would have at home in its crib or play pen.

A further object of the invention is to provide a traveling play pen and crib for use in a vehicle, which has safety means to prevent accidental opening of the vehicle door while it is in use.

Still another object of the invention is to provide a traveling play pen and crib which is simple in design, inexpensive to manufacture, and collapsible for convenience in transporting the same.

Other objects and advantages of the invention will become apparent from the following description of a preferred embodiment thereof as illustrated in the accompanying drawings, and in which, Figure 1 is a partly broken out side elevation of my improved traveling play pen and infant bed as installed in an automobile.

Figure 2 is a plan view of the device shown in Figure 1,

Figure 3 is a detail view of a portion of the device, showing the construction of the anti-door opening safety device, Figure 4 is a perspective view of the play pen and infant bed folded compactly for transportation or storage, Figure 5 is a detail perspective view of a corner joint of the device, and Figure 6 is a fragmentary view of a modified form of the invention.

In traveling with small children, it is always a problem to provide comfort for the child in the same measure as it is provided for adults. It is important that the child's napping and play schedule be not interrupted, so that the child will arrive at the end of the journey in a much pleasanter mental state and good physical condition. The present invention discloses means for achieving this much desired result, and, although it may be applied to many types of movable vehicles such as automobiles and trains, it is illustrated by way of example for use in automobiles.

Reference is now had to the drawings, in which like reference characters denote similar parts throughout the several views. As shown, there is an automobile indicated generally at 2, with front seat 4 and rear seat 6, a rear side door being shown at 8 with door-opening handle at 10.

The bed-pen shown includes a floor member 12 made of plywood or other suitable material, the floor 12 being substantially rectangular in plan, but cut out as at 14 to fit the general contour of the side wall of the automobile, or adjacent arm-rests and other fittings. The floor member is adapted to rest upon the rear seat cushion 16 as shown in Figure 1, and to be supported in a substantially horizontal position by means of two front legs 18 the lower ends 20 of which rest upon the automobile floor 22. The legs 18 are hinged at 24 to the underside of the floor member 12 along its forward edge 26, so as to be foldable for compactness when the whole bed-pen is folded, any suitable means such as hook and eye fasteners being employed to prevent the legs from folding up while the bed-pen is in use.

The pen floor 12 is provided with two normally upstanding front and right side panels 28 and 30. As best seen in Figure 1, the side panel 30 may have upper and lower rails 32 and 34, connected by upstanding end posts 36 and 38, the rearward end post 36 being inclined as shown to fit the contour of the rear back cushion 40. The panel 30 is hinged at 42 and 44 to the abutting edge 46 of the floor member 12, so that the side panel 32 may be folded about its hinges against the upper surface of the floor member 12 when desired, as shown in Figure 4.

The panel area between the rails and posts 32, 34, 36 and 38, may be covered with wire mesh, or with some solid plywood paneling or the like, wire mesh being preferable for it permits maximum visibility both for the child and for adults looking in to be sure the child is all right.

The front panel 28 is substantially rectangular in shape, being formed of top and bottom rails 48 and 50 and side posts 52 and 54. It is intended that the bed-pen be collapsed by first folding the side panel 30 down upon the floor member 12 as already explained, and then to fold the front panel about its lower rail 50 and over the floor member 12, with a portion of the side panel 30 in between the floor member and the front panel, as shown in Figure 4. To accomplish this, it is obvious that the lower rail 50 cannot be hinged directly to the floor member 12 by the usual forms of hinges. Accordingly, I provide a pair of hinge brackets 56 one of which is shown in detail perspective in Figure 5.

The brackets 56 include a flat portion 58, a perpendicular flange 60, and an upstanding portion 62 at right angles to the portions 58 and 60, and having a keyhole slot 64 formed in the portion 62. The bracket shown in Figure 5 shows the bracket 56 intended for use on the end 66 of the front rail 28, that is, with the portion 62 connected to portion 60 along its edge 68. The bracket intended for use on the other end 70 of the front panel 28 will necessarily have its portion 62 connected to portion 60 along its other edge as at 72 in Figure 5.

The base portion 58 is secured to the upper surface of the floor member 12, at the corners, as shown in Figure 2, with the upstanding flange portion 60 extending through a notched out portion 74 at each end of the lower rail 50 of the front panel 28. The side portion 62 is thus on the outside of the end of the bottom rail 50, which has a headed screw 76 threaded into the ends of the rail 50 with its shank extending through the keyhole slot 64 and with its head on the outside of the slot. It is thus apparent that when the side panel 30 has been collapsed against the floor member 12, the front panel 28 may be raised high enough so that its end screws 76 slide to the tops of the keyhole slots 64, which will place the panel 28 sufficiently high above side panel 30 to enable it to pivot on its protruding pivot screws 76, to enable the front panel to be folded down into collapsed position as shown in Figure 4.

While in upstanding position, the front and side panels are held together and upright by means of hook and eye fasteners 78. The space between the rails and sides of the front panel may also be filled in with wire mesh or sheet material.

To prevent accidental turning of the door handle 10, a door safety catch member 80 is provided and recessed at 82 to form a lodgment for the door handle 10 to prevent its turning. The safety catch member 80 is pivoted at 84 to a lever arm 86 which has a slot 88 for receiving the shank of a wing screw 90 carried by side rail 54 of the front panel. A second lever 92 is pivoted to the lever 86 at 87, and has a slot 94 for receiving the shank of a similar wing screw not shown, but protruding out of the side edge of the floor member 12 at 96. By this means the safety catch member 80 may be adjustably positioned and securely held in place. When the front panel 28 is collapsed, the levers supporting the safety catch also fold about the pivot 87 and the wing screws, so as to take up little space. The hooks 78 may engage with the eyes 98 on the side edges of the floor member 12 when the bed-pen is collapsed, so as to hold it in compact form.

As best illustrated in Figure 6, the forward edge 26 of the bottom member 12 may have affixed to its underside a pair of spaced parallel guide rails 100 secured thereto by means of screws 102. An elongated member 104 is slidable between the guide rails, being held in position by means of a wing bolt 106 extending into the member 104. The adjacent edges of the guide rails are undercut, to retain the member 104 against being pulled out of the groove thus formed in any direction other than longitudinally of the groove, and the lateral member 108, through which the screw 106 also extends, bears against the outer surfaces of the side rails, thus permitting the tightening of the wing nut to increase the pressure on the side rails and holding the member 104 in any desired position. The lateral member 110, carried on the outer end of the member 104, may thus be adjustably positioned to bear against the back of the front seat of the automobile, to prevent forward movement of the crib-pen when the brakes are suddenly applied.

Although I have described a preferred embodiment of my invention in specific terms, it is to be understood that various changes may be made in size, shape, materials and arrangement without departing from the spirit and scope of the invention as claimed.

I claim:

1. A combined crib and play pen device adapted for removable installation in an automobile having front and rear seats and a side door between said seats having a door opening handle, said device comprising a horizontal panel arranged to rest upon the seat cushion of said rear seat and having depending leg means to supportably rest upon the automobile floor between said front and rear seats, and retaining means comprising means operatively connected to a forward part of said panel and connectible to said door opening handle in a manner to preclude forward shifting of said device while precluding opening movement of said handle.

2. A combined crib and play pen device for installation in an automobile having front and rear seats and a side door therebetween having a door opening handle, said device comprising a horizontal panel arranged to rest upon the rear seat cushion with a forward part of said panel projecting forwardly from said seat cushion toward said front seat, leg means depending from a forward part of said panel for supportably engaging the floor of the automobile between said front and rear seats, a rearward part of said panel being abutted with the back cushion of said rear seat to prevent rearward shifting of said device, and abutment means extending forwardly from a forward part of said panel for abutting the back of said front seat to prevent forward shifting of said device.

3. A combined crib and play pen device for installation in an automobile having front and rear seats and a side door therebetween having a door opening handle, said device comprising a horizontal panel arranged to rest upon the rear seat cushion with a forward part of said panel projecting forwardly from said seat cushion toward said front seat, leg means depending from a forward part of said panel for supportably engaging the floor of the automobile between said front and rear seats, a rearward part of said panel being abutted with the back cushion of said rear seat to prevent rearward shifting of said device, and abutment means extending forwardly from a forward part of said panel for abutting the back of said front seat to prevent forward shifting of said device, said abutment being adjustably extensible to provide for different spacings of said device from the back of the front seat.

4. A device providing a combined crib and playpen for installation in an automobile having front and rear seats and a floor therebetween and a side door having a handle on its inward side, said device comprising a collapsible crib body comprising a floor panel adapted to rest upon the seat cushion of the rear seat adjacent a sidewall of the automobile and to project forwardly from said rear seat cushion, leg means on the forward part of said panel to rest upon the automobile floor between the front and rear seats, said crib body being devoid of a side panel at the side thereof adjacent to the automobile sidewall so as to expose said sidewall and having a side panel on the opposite side thereof, said side panel being hinged to said floor panel to fold flat upon said floor panel when said device is collapsed, said crib body being devoid of a rear panel so as to expose the back cushion of the rear seat and having a front panel hinged to said floor panel to fold down upon said side panel when folded in the collapsed condition of said device, and quick detachable means for supportably connecting said side panel and said front panel together whereby said side panel and front panel mutually support each other in their erect operative positions, and retaining means mounted on said front panel and engageable in the erect position of said front panel with said door handle to prevent forward shifting of said crib body relative to said front and rear seats.

ROBERT G. HALL.

REFERENCES CITED

The following references are of record in the file of this patent:

UNITED STATES PATENTS

| Number | Name | Date |
| --- | --- | --- |
| 484,975 | Perry | Oct. 25, 1892 |
| 1,096,221 | Caldwell | May 12, 1914 |
| 1,233,661 | Gordon | July 17, 1917 |
| 2,313,834 | Mathaus | Mar. 16, 1943 |

FOREIGN PATENTS

| Number | Country | Date |
| --- | --- | --- |
| 640,160 | France | Mar. 24, 1928 |